United States Patent [19]

Luria

[11] Patent Number: 5,205,515
[45] Date of Patent: Apr. 27, 1993

[54] AIRCRAFT FUSELAGE CONSTRUCTION INCLUDING FOOD CARRIER

[75] Inventor: David Luria, Tel Aviv, Israel

[73] Assignee: Fuselage Engineering Services Ltd., Tel-Aviv, Israel

[21] Appl. No.: 812,466

[22] Filed: Dec. 23, 1991

[30] Foreign Application Priority Data

Dec. 27, 1990 [IL] Israel .......................................... 96803

[51] Int. Cl.⁵ ............................................. B64D 11/00
[52] U.S. Cl. .................................. 244/118.5; 244/118.1; 186/40; 414/399; 414/392
[58] Field of Search ............................ 244/118.1, 118.5; 105/327; 186/40, 51; 414/282, 399, 392

[56] References Cited

U.S. PATENT DOCUMENTS

| | | | |
|---|---|---|---|
| Re. 32,176 | 6/1986 | Vernon | 244/118.5 |
| 2,869,739 | 1/1959 | Davis | 414/392 |
| 3,102,607 | 9/1963 | Roberts | 244/118.5 |
| 3,179,208 | 4/1965 | Umanoff | 244/118.5 |
| 3,701,396 | 10/1972 | House | 244/118.5 |
| 3,999,630 | 12/1976 | McPhee | 244/118.5 |
| 5,074,496 | 12/1991 | Rezag et al. | 244/118.1 |

Primary Examiner—Joseph F. Peters, Jr.
Assistant Examiner—Anne E. Bidwell
Attorney, Agent, or Firm—Benjamin J. Barish

[57] ABSTRACT

An aircraft fuselage construction includes a track overlying and parallel to the aisle, a food carrier having wheels on its bottom engageable with the deck, and a guiding member engageable with the track for guiding the movement of the food carrier along the aisle.

16 Claims, 9 Drawing Sheets

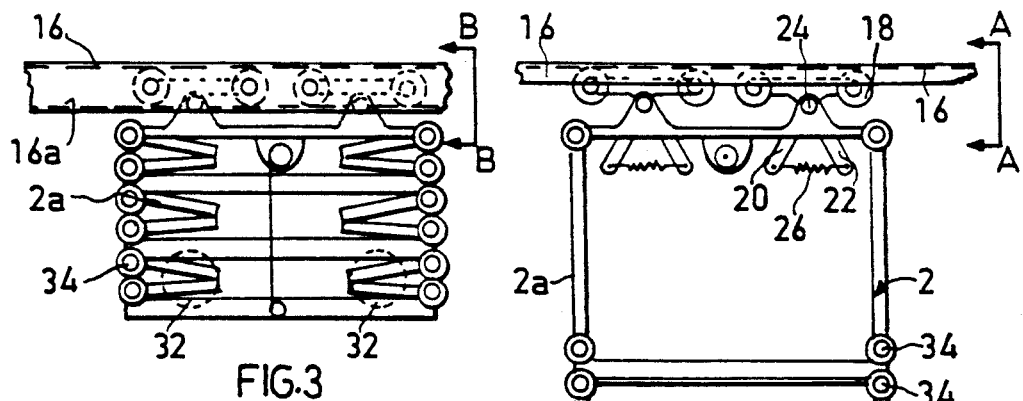
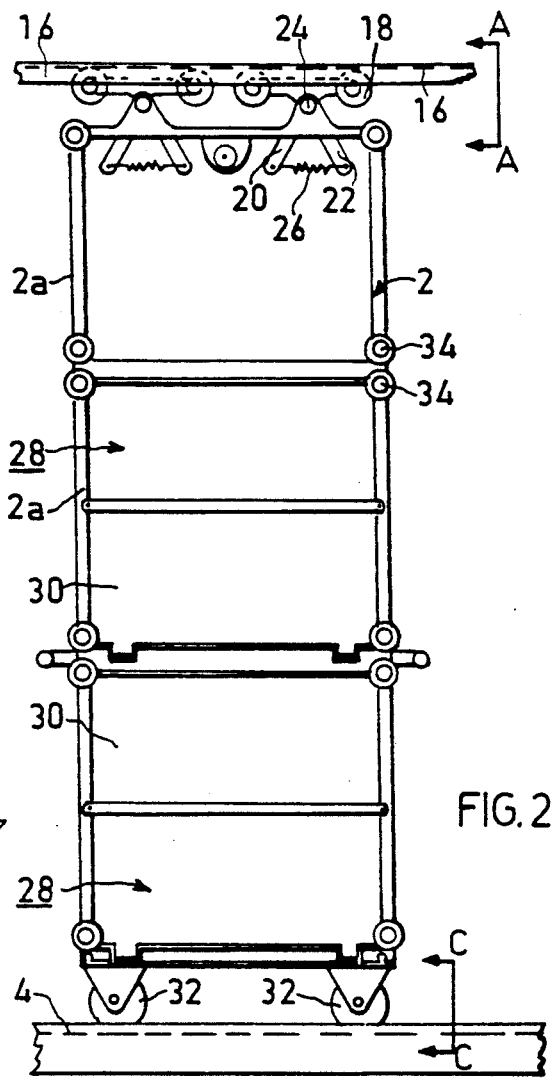
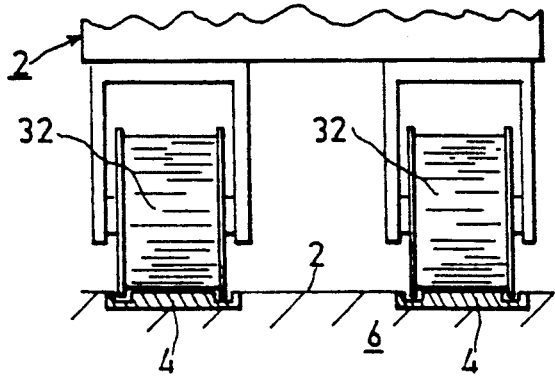
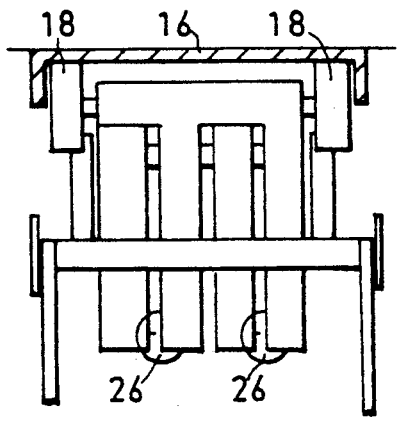
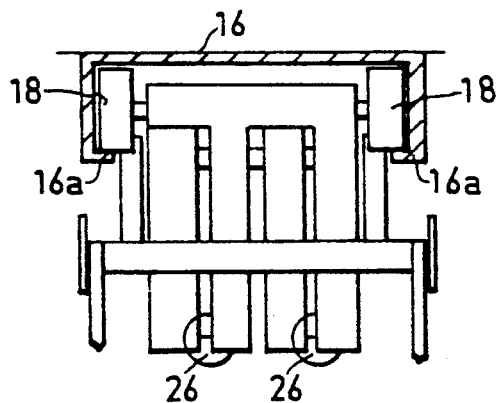

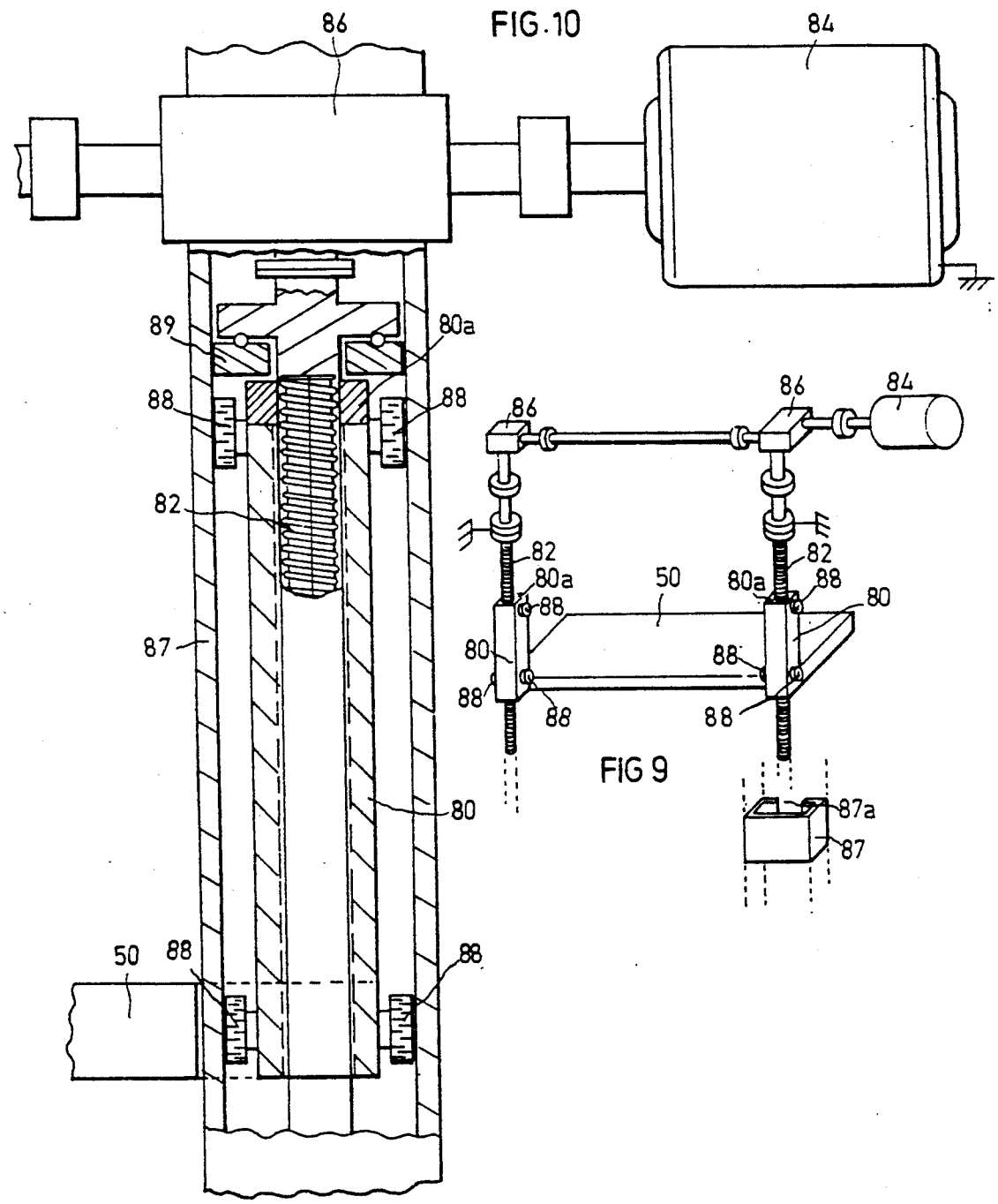

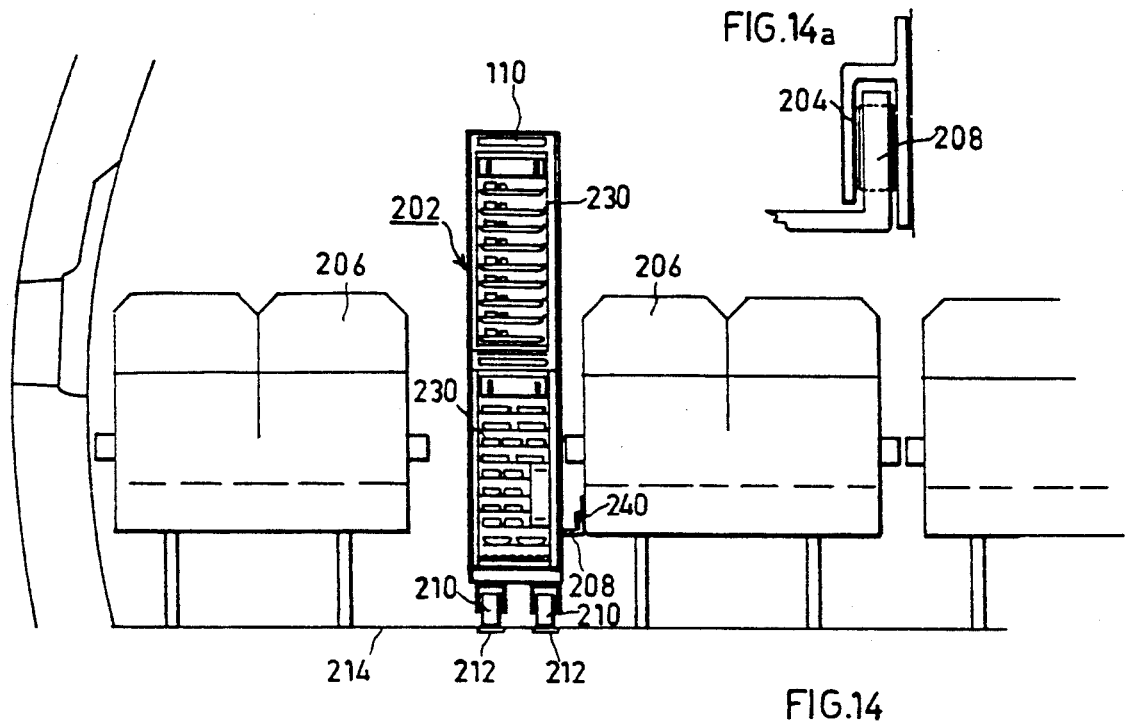
FIG.14a
FIG.14
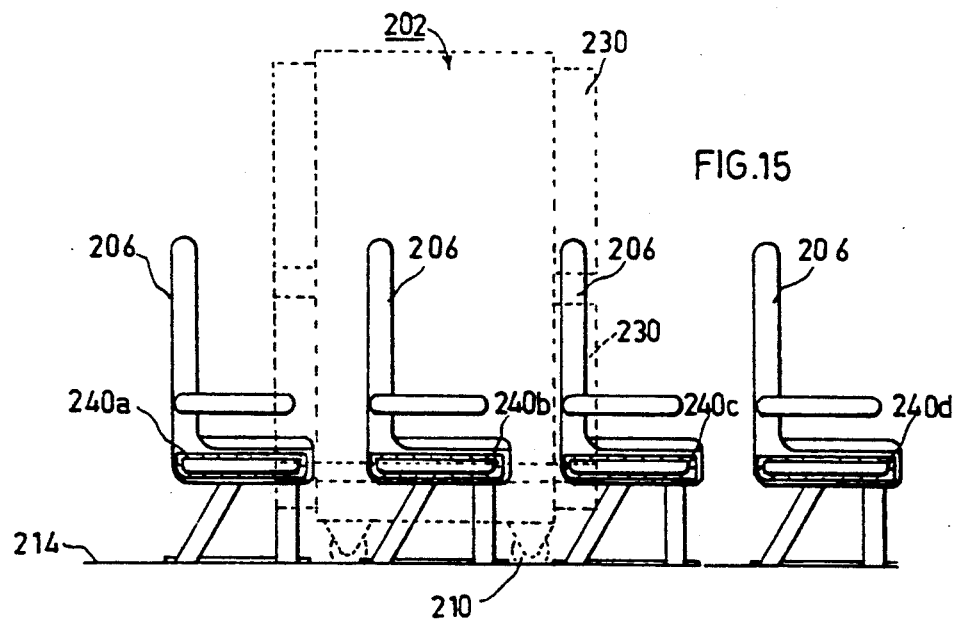
FIG.15

AIRCRAFT FUSELAGE CONSTRUCTION INCLUDING FOOD CARRIER

FIELD AND BACKGROUND OF THE INVENTION

The present invention relates to the fuselage construction of an aircraft, and particularly to one including a food carrier for conveying food and drink to the passengers.

The conventional passenger aircraft includes one or more galleys for preparing and distributing food, and wheeled carts to be moved along the aisles when distributing the food to the passengers. One disadvantage of the existing systems is that the galleys take up considerable space, thereby decreasing the amount of space available for passenger seats. Another disadvantage is that when the food is being delivered, or trash is being collected, the respective aisle is substantially blocked; this interferes with the movement of the passengers along the aisle, and such movement, when required, interferes with the distribution of the food. A further disadvantage is that the carts are hard to push along the aisles such that the distribution of the food may require two attendants for each cart, one pushing from the rear and one pulling from the front.

OBJECTS AND BRIEF SUMMARY OF THE INVENTION

An object of the present invention is to provide a cabin construction particularly for passenger aircraft having advantages in the above respects.

According to the present invention, there is provided an aircraft fuselage construction including a cabin, a deck, a ceiling, and a plurality of passenger seats fixed to the deck and defining an aisle providing access to the seats; characterized in that the cabin further includes a track spaced above the deck to overlie and to be parallel to the aisle, a food carrier having wheels on its bottom engageable with the deck, and a guiding member engageable with the track for guiding the movement of the food carrier along the aisle.

According to further features in the preferred embodiments of the invention described below, the food carrier includes a frame defining an opening for receiving a food container to be carried by the frame when using the food carrier for serving food to the passengers. More particularly, the frame preferably includes at least one vertically spaced opening receiving at least one food container; preferably there are two food containers.

According to further features, the aircraft cabin includes a storage compartment above the toilet/galley/aisle compartments for storing a plurality of food containers, an elevator for conveying the containers between the storage compartment and the food carrier, and a horizontal conveyor for conveying a container from its location in the storage compartment to or from the elevator.

In one preferred embodiment of the invention described below, the track is secured to the cabin ceiling, and the food carrier extends the complete height of the cabin from its deck to its ceiling.

In a second described embodiment, the track is constituted of sections each fixed to one of the aisle passenger seats on the aisle side thereof; the food carrier extends for less than the complete height of the aisle and includes a laterally-extending guide engageable with the track sections for guiding the movement of the conveyor along the aisle.

An aircraft cabin constructed in accordance with the foregoing features enables the unused space over the toilet or galley compartments, or over the aisle, to be used for storing the food containers; it thereby obviates the need for the conventional galley and therefore frees the space normally used in the conventional galley for additional passenger seats. In addition, the novel construction facilitates the distribution of food to the passengers and minimizes blocking the aisle when the food is being distributed, or when the trash is being collected. Accordingly, there is less interference with the movement of the passengers or crew along the aisle; and where such movement is required, there is less interference by such movement with the distribution of the food to the passengers.

A still further advantage is that the food carrier may be more easily moved by a single attendant, and therefore enables a significant reduction in the number of attendants normally required in the distribution of food and in the collection of the trash. A still further advantage is that the food carrier may be of increased volume, thereby enabling it to carry more food than in the conventional serving cart.

Further features and advantages of the invention will be apparent from the description below.

BRIEF DESCRIPTION OF THE DRAWINGS

The invention is herein described, by way of example only, with reference to the accompanying drawings, wherein:

FIG. 2 is a side elevational view of the food carrier in the cabin construction of FIG. 1;

FIG. 3 illustrates the food carrier of FIG. 2 in its collapsed condition when not in use;

FIGS. 4a, 4b and 4c are enlarged fragmentary views as viewed along lines A—A, B—B and C—C of FIGS. 2 and 3, respectively;

FIGS. 9 and 10 more particularly illustrate the elevator drive;

FIG. 14 is a front view illustrating another form of cabin construction including a food carrier in accordance with the present invention;

FIG. 14a is an enlarged fragmentary view of a portion of FIG. 14;

FIG. 15 is a side elevational view of the cabin construction to accommodate the food carrier as illustrated in FIG. 14;

DESCRIPTION OF PREFERRED EMBODIMENTS

Figure 1:
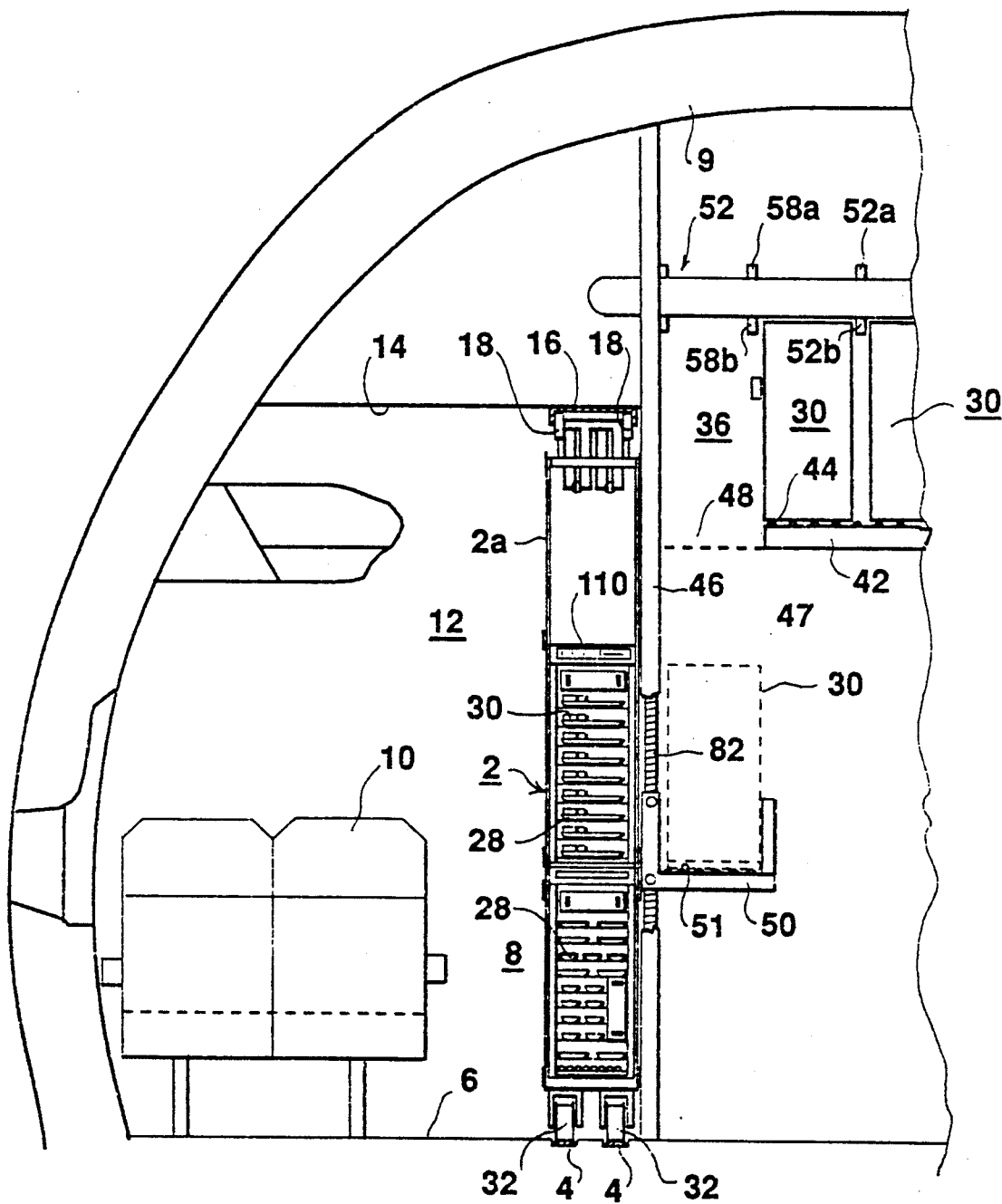
FIG. 1 diagrammatically illustrates one form of cabin construction with food carrier in accordance with the present invention.

The aircraft cabin construction illustrated in FIGS. 1-13 of the drawings is designed particularly for aircraft adapted to accommodate a relatively large number of passengers to be supplied with food and drink during the operation of the aircraft. Instead of using the conventional wheeled carts which are moved along the aisles for this purpose, the illustrated aircraft includes a food carrier, generally designated 2, movable along tracks 4 secured to and parallel to the aisle 8 extending longitudinally of the aircraft to provide access to the passenger seats 10. As shown in FIG. 1, the food carrier 2 is narrow and located on the extreme side of the aisle 8, so that its use in the distribution of the food and drink will minimize interference with the movement of passengers or crew through the aisle 8; similarly the movement of passengers or crew through the aisle 8 will minimize interference with the distribution of the food.

In the embodiment of the invention illustrated in FIGS. 1-13, the food carrier 2 extends the complete height of the passenger cabin 12 to its ceiling 14. Another track 16 is secured to the ceiling 14 and serves as a stabilizer support and also as a guide for the upper end of the food carrier 2. For this purpose, the upper end of the food carrier 2 is provided with a plurality of rollers 18 movable within track 16.

As shown more particularly in FIG. 2, and also in FIG. 4a, the rollers 18 are divided into two groups, of four rollers in each group. Each group of four rollers is supported by a pair of arms 20, 22, pivotally and slidably mounted to the upper end of the food carrier 2. The two arms 20, 22 are pivotally mounted to each other by a transversely-extending pin 24 supporting the four rollers 18. The opposite ends of the arms are urged towards each other by a spring 26, such that the spring urges the four rollers 18 upwardly into firm contact with the inner surface of the track 16.

The food carrier 2 is constructed of a plurality of frame members 2a defining a plurality of vertically-spaced rectangular openings 28 each for receiving a food container 30 to be carried by the frame when using the food carrier for serving food to the passengers. In the illustrated construction, the food carrier 2 defines three vertically-spaced openings, but only the lower two are used for receiving food containers 30. The lower end of the food carrier 2 is supported by two pairs of wheels 32 engageable with the two rails 4 fixed to the deck 6. The two lower rails 4, as well as the upper track 6 which guides and stabilizes the movement of the food carrier 2, extend for the complete length of the aisle 8. This enables the food carrier 2 to be moved along the complete length of the aisle and thereby to be used for serving food and drink to all the passengers occupying the seats 10 of the aircraft cabin 12.

At some convenient location of the aisle 8, such as at one or both ends, the upper track 16 is formed with side flanges 16a (FIG. 4b) underlying the upper rollers to support the food carrier 2 in suspension above the cabin deck 6, with the lower wheels 32 folded inside. The food carrier is constituted of a plurality of frame members 2a pivotally mounted to each other, as shown at 34 in FIGS. 2 and 3, to permit the food carrier frame to be folded into a collapsed, compact condition, in order to occupy a minimum volume at this storage location of the aisle.

Figure 5:
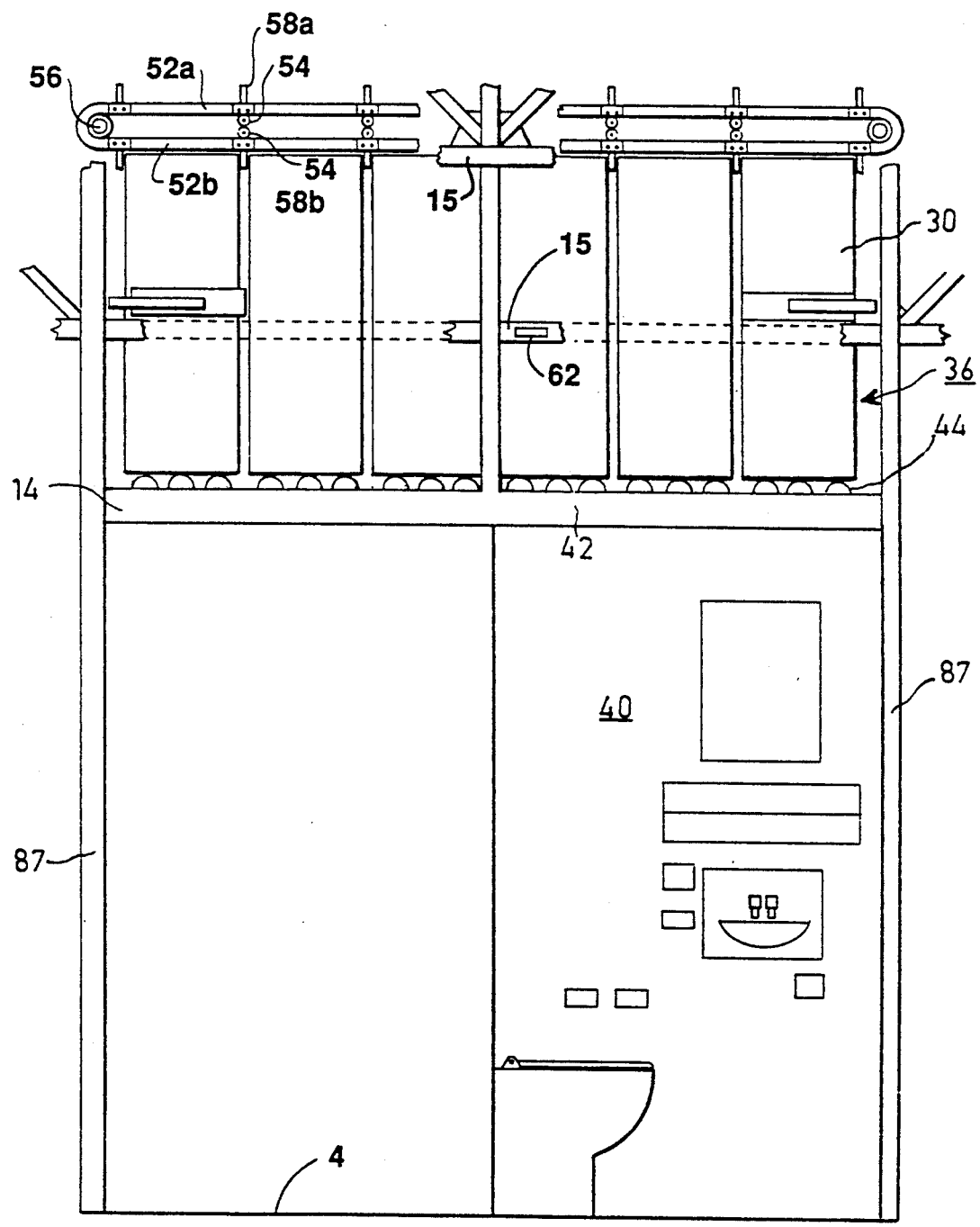
FIG. 5 is a side elevational view more particularly illustrating the storage compartment for storing the food containers carried by the food carrier.

As shown particularly in FIGS. 1 and 5, the food containers 30 are stored in a storage compartment 36 between the upper part of the fuselage 9, and overlying a ceiling 42 of the toilet compartments 40. Storage compartment 36 is dimensioned to accommodate one or more rows of food containers 30, and is provided with a supporting base 42 having a plurality of rollers 44 on its upper surface permitting the food containers 30 to be freely moved within the storage compartment.

As shown in FIG. 1, supporting base 42 in the storage compartment 36 terminates short of the vertical post 46 under the inner aisle 47 adjacent to the main aisle 8. This provides a space 48 for accommodating an elevator platform 50 movable from a raised position alignable with base 42 in the storage compartment 36, to a lowered position in alignment with any one of the two vertically-spaced openings 28 in the food-carrier 2. This enables a food container 30 to be easily transferred to or from one of the rectangular openings in the food carrier. The upper surface of the elevator platform 50 is also provided with a plurality of rollers 51, to facilitate the manual shifting of a food container 30 to or from the elevator platform when transferring a food container from the storage compartment 36 to the food carrier 2, or for returning a food container from the food carrier 2 back to the storage compartment 36.

Each of the food containers 30 within the storage compartment 36 may be transferred to or from the elevator platform 50 when aligned with the opening 48 in the storage compartment by means of a longitudinal conveyor, generally designated 52. Conveyor 52 is in the form o a closed-loop belt having an upper stretch 52a and a lower stretch 52b supported in spaced relation by a plurality of rollers 54 and driven by a motor 56 (FIG. 5) at one or both ends.

Both stretches 52a, 52b of the conveyor belt 52 include a plurality of pusher members 58a, 58b spaced apart such that each food container 30 is straddled by a pair of such pusher members. Thus, when a motor 56 is energized to move the conveyor belt 52, the pusher members push each food container towards (or away from) the end of the storage compartment 36 occupied by the elevator platform 50.

Figure 6:
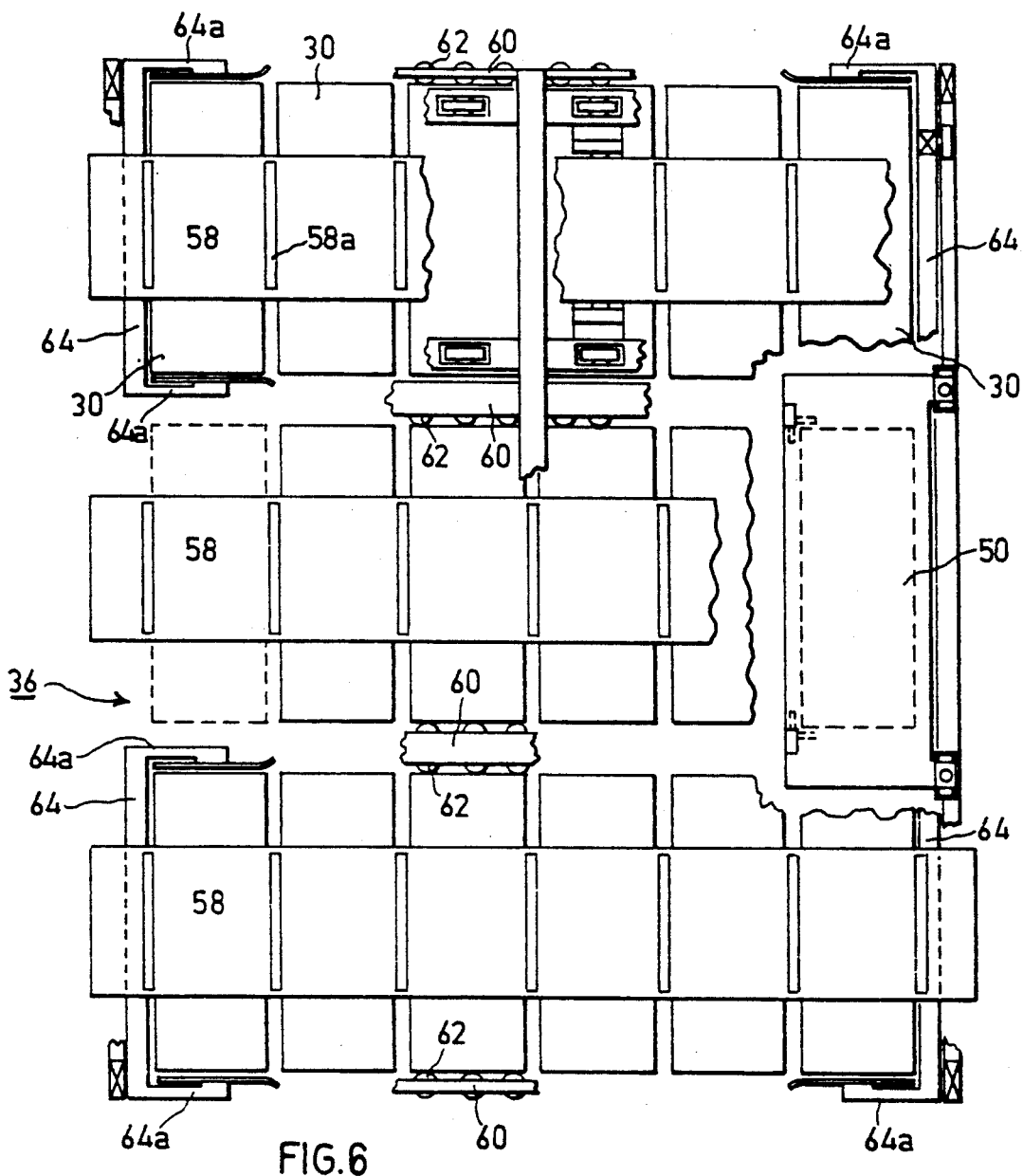
FIG. 6 is a top plan view illustrating the storage compartment for the food container.
Figure 7:
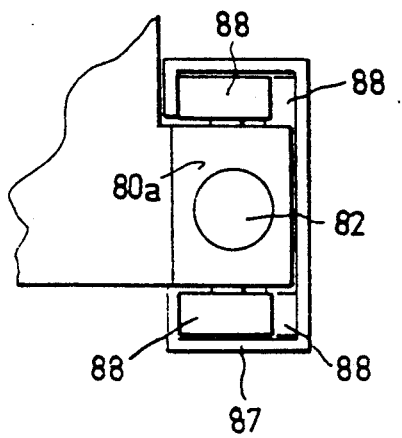
FIG. 7 is an enlarged fragmentary view of a portion of FIG. 6.

As shown in FIG. 6, the storage compartment 36 is constructed of a plurality of frames 60 to accommodate a plurality of rows of the food containers 30, with each row including a plurality of such containers. In the illustrated example, there are four frames 60 for accommodating three rows of containers 30, with six containers in each row, except that the middle row has two containers less in order to accommodate the two elevator platforms 50 (the second elevator is not shown). All the containers are movably supported on the rollers 44 lining the upper surface of base 42 of the storage compartment 36. Thus, each food container 30 can be moved either in the direction along its respective row, or transversely of its respective row, in order to move the container to the space occupied by the elevator platform 50, whereupon the elevator platform may lower the food container to the opening in the food carrier 2 to receive the food container.

To facilitate movement of the food containers within the storage compartment 36, the frame members 60 are also provided with rollers, as shown at 62, engageable with the sides of the food containers.

There are three longitudinal conveyors 58, one for each of the three rows of the food containers 30 within the storage compartment and capable of moving each container longitudinally of its respective row. On each side of the storage compartment 36, there are two further transverse conveyors, generally designated 64, on opposite sides of the outer rows, which convey the end container in the respective row transversely of its frame 60 to the elevator platform 50 aligned with the middle row of food containers, whenever it is desired to lower a food container from one of the end rows to the food carrier 2.

Figure 8:
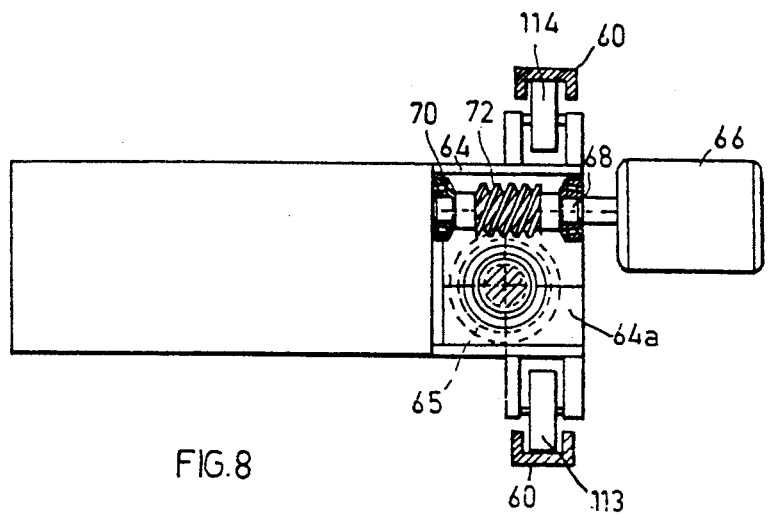
FIG. 8 is a a view, partly in section, illustrating the transverse drive in the storage compartment of FIG. 6.

The construction of each transverse conveyor 64 is more particularly illustrated in FIGS. 6 and 8. It includes a U-shaped conveyor member 64 of a length slightly longer than the length of a food container 30 and having a pair of inturned ends, e.g., 64a, straddling the opposite ends of the food container. A static screw 65 extends at the end of the storage compartment 36 and passes freely through the openings formed in the two inturned ends 64a of the conveyor members 64. Each conveyor member 64 carries an electric motor 66 and a pair of bearings 68, 70, for supporting the motor drive shaft, which shaft includes a gear 72 meshing with screw 65. Thus the energization of motor 66 rotates its gear 72 which, meshing with screw 65, moves its respective conveyor member 64, and thereby the container 30 straddled between its two ends 64a, towards or away from the elevator platform 50, according to the direction of rotation of motor 66. The movement of conveyor member 64 is guided by a pair of end rollers 113, 114 received in frame 60

The elevator platform 50 lowers the containers 30 from the storage compartment 36 to the food carrier 2. As particularly illustrated in FIGS. 9 and 10, elevator platform 50 is supported at its opposite ends by a pair of sleeves 80 having threaded openings in their end walls 80a receiving screws 82, such that the rotation of the screws raises or lowers the elevator platform 50, according to the direction of rotation. The two screws 82 are synchronously rotated by motor 84 coupled to them via two gear boxes 86. The sleeves 80 are of rectangular section and are received within vertical posts 87 on opposite sides of the aisle supporting the storage compartment 36. These posts are formed with a longitudinally-extending opening 87a, as shown in FIG. 9, to accommodate the connections of the sleeves 80 to the elevator platform 50. Sleeves 80 are further provided with external rollers 88 engageable with the inner faces of the vertical posts 87 to guide the movement of the sleeves within the vertical posts as the screws 82 are rotated by the motor 84. The elevator 50 is supported on the static part of bearing 89.

It will thus be seen that the food containers 30 are normally stored in the storage compartment 36 overlying the toilet compartments 40. The storage compartment may also overlie the pantry, and/or the transverse entrance/exit aisles adjacent the cabin doors (not shown), depending on the storage space available. When food is to be served, the containers may be individually conveyed to the elevator platform 50 by the longitudinal conveyors 58, and by the transverse conveyors 64, and then lowered by the elevator platform to the food carrier 2. After the serving of the food has been completed, the trash may be collected in the food containers, and the food containers then moved to the elevator platform 50, where they may be raised by the elevator to the storage compartment 36.

Figure 11B:
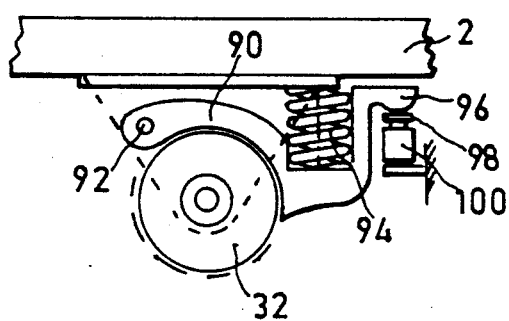
FIGS. 11a and 11b, respectively, illustrate the manual actuator, and the mechanism for locking and releasing the wheels, in the food carrier of FIG. 6.
Figure 11:
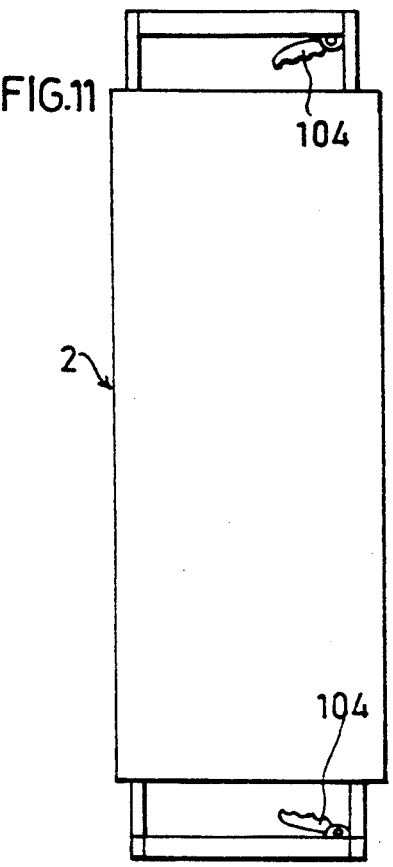
FIG. 11 is a side elevational view illustrating one of the food carriers in the cabin construction of FIG. 1.
Figure 12:
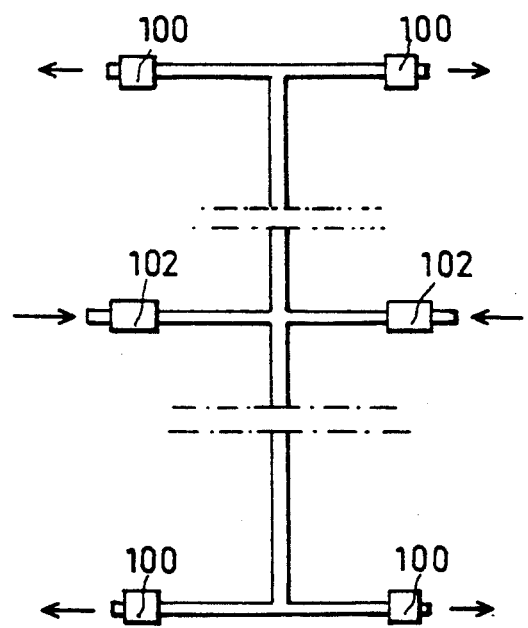
FIG. 12 is a diagram illustrating the fluid circuit in the wheel locking and releasing mechanisms of FIGS. 11a and 11b.

The wheels 32 at the lower ends of the food carrier 2 are normally locked against rotation by locking members 90, as shown particularly in FIG. 11b. Each of the locking members 90 is in the form of a shoe pivotally mounted to the food carrier frame 2 at one end by a pin 92 and engaged at the opposite end by a spring 94 effective normally to press the shoe firmly against the wheel 32 and thereby to lock it against rotation. Each shoe 90 is formed with an extension 96 engageable by a piston 98 movable out of a cylinder 100 under fluid pressure to move the locking shoe 90 away from the respective wheel 32, whenever it is desired to move the food carrier 2 to a different position along the aisle 8.

Figure 11A:
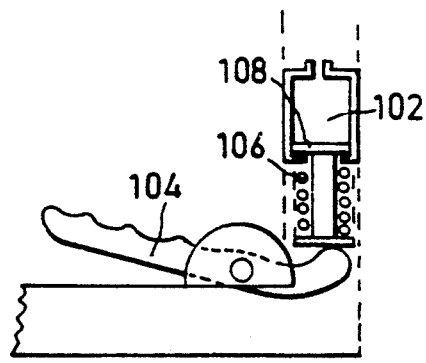

It will thus be seen that each of the four wheels 32 and 18, supporting the food carrier 2, is normally locked against rotation by its respective locking shoe 90, but all the wheels are freed for rotation when fluid pressure is applied to its respective cylinder 100. The four cylinders 100 for the wheels 32 and 18 are connected in a fluid circuit illustrated in FIG. 12 so as to be simultaneously actuated by the application of fluid pressure via any one of two cylinders 102 supported at vertically-spaced locations at two sides of the food carrier 2, each actuatable by a manual lever 104. Thus, as shown particularly in FIG. 11a, each manual lever 104 may be manually pivotted, against the action of a spring 106, in order to move a piston 108 within its respective cylinder 102, and thereby to transmit fluid pressure to the cylinders 100 adjacent to wheels 32 and 18 to move their respective locking shoes 90 to their released conditions.

The food carrier 2 is thus normally locked against movement by the locking shoes 90 for each of its the wheels 32, 18. However, whenever it is desired to move the food carrier to another position along the aisle, the operator grasps and pivots one of the handles 104, which causes pressurized fluid (e.g., oil) to be transmitted from the respective cylinder 102 via the fluid circuit illustrated in FIG. 12 to the cylinders 100 for all of the wheels 32, 18, to move the locking shoes 90 to their released condition with respect to their respective wheels 32, thereby permitting the food carrier 2 to be moved along the wheels 32 so long as the handle 104 remains depressed. As soon as the handle is released, the locking shoes 90 return to their locking positions, thereby locking the food carrier against any further movement.

The loading and unloading of the food carrier 2 with the food containers 30 may be effected automatically under the control of a computer. The computer may also record the menu selections of each passenger and display those menu selections at the time of distributing the food to the passengers. For this purpose, each of the two opposite sides of the food carrier 2 includes a control and display panel, generally designated 110. Two such panels would be provided when the food carrier 2 is operated by two attendants.

Figure 13:
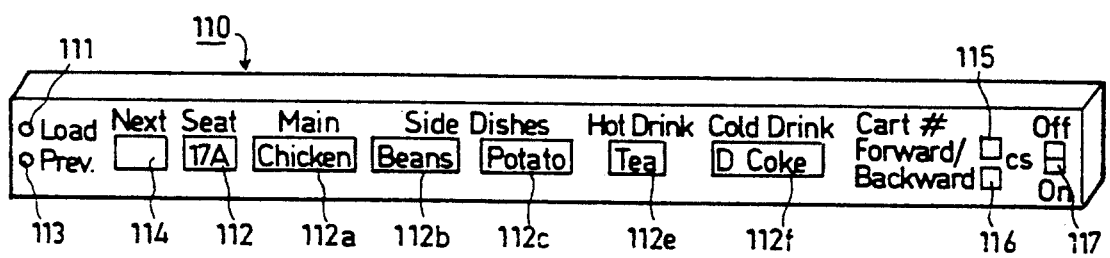
FIG. 13 illustrates a panel which may be carried on each side of the food carrier for aiding in the distribution of the food to the passengers.

The control and display panel 110 at each side of the food carrier is more particularly illustrated in FIG. 13. It includes a LOAD button 111 which transfers data from the main computer the menu selections for the respective passenger seat. The passenger seat is shown in display 112, and the menu selections for the respective passenger seat are shown in displays 112a-112f. Panel 110 further includes a PREV button 113 which may be depressed to display the menu selections for the previous passenger seat, and a NEXT button 114 which may be depressed in order to display the menu selections of the next passenger seat.

Panel 110 further includes a display 115 displaying the number of the food carrier 2, another display 116 for displaying whether the panel is at the forward or rear end of the food carrier, and an ON/OFF button 117 for turning on or off the control panel.

It will thus be seen that the cabin construction illustrated in FIGS. 1-13, particularly the food carrier and distribution system, takes up a minimum of space both for the storage of the food before distribution, and also during the distribution of the food, thereby increasing the amount of space available for passenger seats. In addition, since the food carrier 2 does not occupy the complete width of the aisle, the aisle is still substantially free for movement of passengers or crew even during the distribution of the food, and such movement also does not interfere with the distribution of the food. Still further, instead of requiring two attendants for one food cart as in the conventional system, here two attendants can handle, in effect, the food normally carried by two carts, and even then with much less effort, thereby decreasing the number of crew required in the distribution of the food.

FIGS. 14, 14a and 15 illustrate another embodiment of the invention. Thus, in this embodiment, instead of having the food carier, therein designated 202, extend for the complete height of the cabin, it terminates short of the cabin ceiling. The food carrier is therefore, effectively, the height of two food containers 230, as only two food containers can be used in a convenient manner for the distribution of the food.

Since the food carrier 202 illustrated in this embodiment is not guided and stabilized by the track (16, FIG. 1) and rollers (18, FIG. 1) at the upper end of the food carrier, as in the FIGS. 1-13 embodiment of the invention, the guiding and stabilizing track in the embodiment of FIGS. 14-15 is in the form of a plurality of track sections 204, and more particularly shown at 204a-204d in FIG. 15, each fixed to one of the aisle passenger seats 206 on the aisle side thereof. Each of these track sections 204a-204d receives a guide arm 208 (FIGS. 14, 14a) extending laterally of the food carrier 202, which guide arm is of a length to span the space between two of the passenger seats 206. Thus, as the food carrier 202 is moved on its wheels 210 along the tracks 212 secured to the cabin deck 214, the laterally-extending guide 208 fixed to the food carrier 202 is successively received within the track sections 204a-204d fixed to the passengers seats 206 to guide and stabilize the food carrier during its movement along the passenger aisle.

In all other respects, the construction and operation of the cabin, and particularly the food storage and delivery system, in the arrangement illustrated in FIGS. 14 and 15 are the same as described above with respect to FIGS. 1-13.

Figure 16:
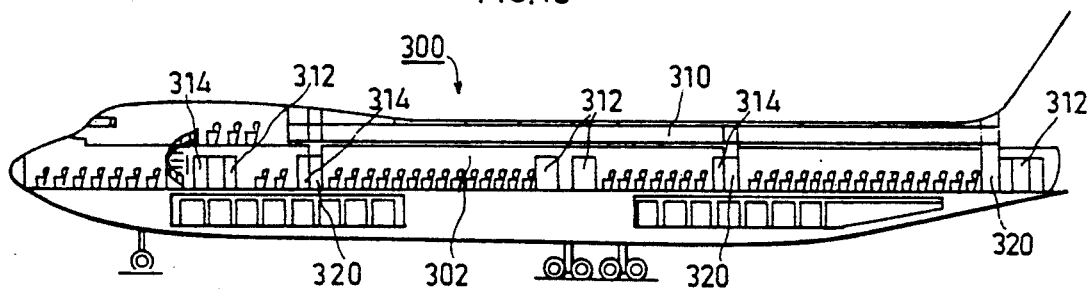
FIG. 16 is a longitudinal sectional view illustrating another form of aircraft cabin construction in accordance with the present invention.
Figure 17:
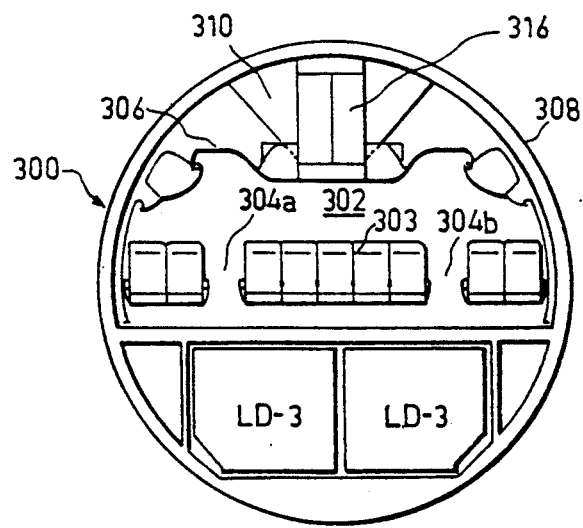
FIG. 17 is an enlarged transverse sectional view of the cabin construction of FIG. 16.

FIGS. 16 and 17 illustrate another aircraft fuselage construction, generally designated 300, in accordance with the present invention. In this construction, the aircraft includes a passenger compartment 302 having seats 303 defining two longitudinally-extending aisles 304a, 304b, as well as a plurality of transversely-extending entrance/exit aisles (not shown). The passenger compartment includes a ceiling 306 which is spaced from the outer fuselage wall 308 to define a longitudinally-extending space 310 between them. The illustrated aircraft further includes lavatories 312 and galleys 314 also covered by ceiling 306 and spaced from the outer fuselage wall 308.

The longitudinally-extending space 310 is used as the cart-storage compartment for storing the food-serving wheeled carts 316. This compartment is serviced by a plurality of elevators 320 (three being seen in FIG. 16) located at spaced locations along its length. It may extend for the complete length of the passenger compartment of the aircraft or for only a part of its length. The construction of the cart storage compartment and the food carrier may be otherwise the same as described above.

It will be seen that in the construction illustrated in FIGS. 16 and 17, the cart-storage compartment is located longitudinally of the aircraft along its main aisle, rather than transversely over the transverse entrance/exit aisles and/or above the lavatories, such a construction provides a number of advantages: It permits loading and unloading of food and the food carts from the end of the aircraft, and therefore does not interfere with passengers boarding or leaving the aircraft from the transverse entrance/exit aisles. It also permits the food and carts to be loaded into or unloaded from the aircraft independently of the passengers, thereby decreasing turnaround time. In addition, it avoids the need for reinforcement of the transverse entrance/exit aisle construction.

While the invention has been described with respect to several preferred embodiments, it will be appreciated that many other variations, modifications and applications of the invention may be made.

What is claimed is:

1. An aircraft fuselage construction including a cabin, a deck, a ceiling, and a plurality of passenger seats fixed to the deck and defining an aisle providing access to the seats; characterized in that said cabin further includes a track spaced above said deck to overlie, and to be parallel to, said aisle, a food carrier having wheels on its bottom engageable with the deck, and a guiding member engageable with said track for guiding the movement of the food carrier along said aisle.

2. The aircraft construction according to claim 1, wherein said food carrier includes a frame defining an opening for receiving a food container to be carried by the frame when using the food carrier for serving food to the passengers.

3. The aircraft construction according to claim 2, wherein said frame includes at least one vertically spaced opening for receiving at least one food container.

4. The aircraft construction according to claim 2, further including a storage compartment below the upper part of the fuselage and above the toilet or pantry compartment or aisle for storing a plurality of food containers, an elevator for conveying the containers between the storage compartment and the food carrier, and a horizontal conveyor for conveying each container from its location in the storage compartment to or from the elevator.

5. The aircraft construction according to claim 2, wherein said track includes side flanges at a location thereof for storing the food carrier, said side flanges being engaged by the rollers of the food carrier when in its said stored location for supporting the food carrier in suspension above the cabin deck.

6. The aircraft construction according to claim 5, wherein said frame is collapsible permitting it to be collapsed when not carrying a food container and is in said storage location.

7. The aircraft construction according to claim 1, wherein said track is secured to the cabin ceiling, and said food carrier extends the complete height of the cabin from its deck to its ceiling.

8. The aircraft construction according to claim 7, wherein the upper end of said food carrier includes rollers for guiding the movement of the conveyor along said track.

9. The aircraft construction according to claim 8, wherein said rollers are spring-urged upwardly to engage said track.

10. The aircraft construction according to claim 9, wherein said rollers are carried by a pair of arms pivotally mounted together at one end, said rollers being carried at said one end, and a spring urging the opposite ends of said pair of arms together, such as to pivot the arms to apply an upward force to the rollers to press them into firm contact with the track.

11. The aircraft construction according to claim 1, wherein said track is constituted of sections each fixed to one of the aisle passenger seats on the aisle side thereof, and said food carrier extends for less than the complete height of the cabin and includes a laterally-extending guide engageable with said track sections for guiding the movement of the conveyor along the aisle.

12. The aircraft construction according to claim 1, wherein said wheels on the bottom of the food carrier include locking members normally locking the wheels against rotation, said conveyor further including manually-operated actuators for actuating the locking members to their releasing positions with respect to the wheels.

13. The aircraft construction according to claim 1, wherein said food carrier occupies less than the complete width of the aisle and is located at one side thereof so as to permit passenger movement through the aisle.

14. The aircraft construction according to claim 1, wherein said food carrier is under the control of a computer, said food carrier including a panel having control buttons for controlling the operation of the computer, and displays for displaying the food selections made by the passengers.

15. The aircraft construction according to claim 1, wherein said aisle is a transversely-extending entrance/exit aisle.

16. The aircraft construction according to claim 1, wherein said aisle is a longitudinally-extending aisle.

* * * * *